Sept. 2, 1924.                    F. J. NANKIVELL                    1,507,245
                                 PORTABLE POWER SAW
                              Filed Feb. 16, 1922              2 Sheets-Sheet 2
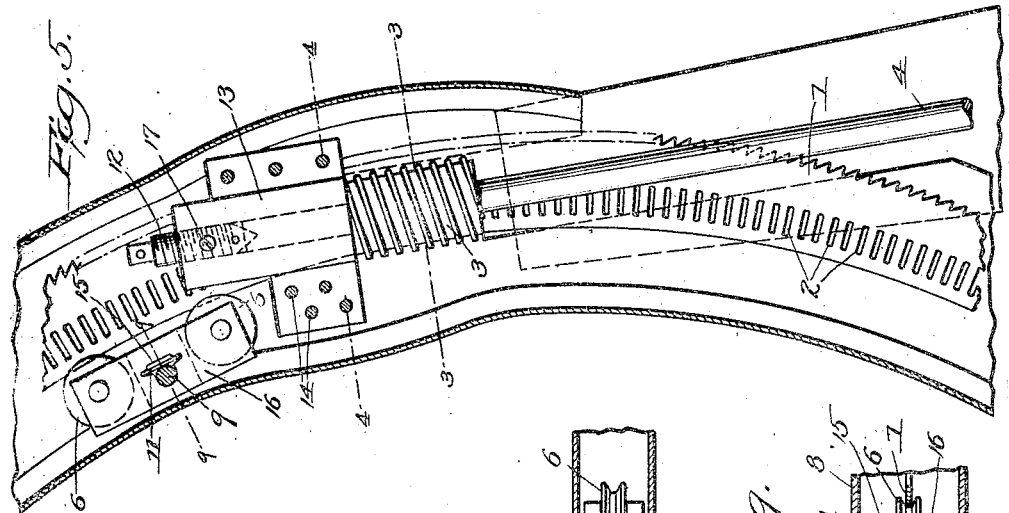
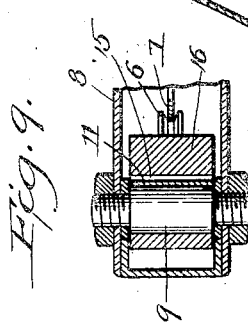
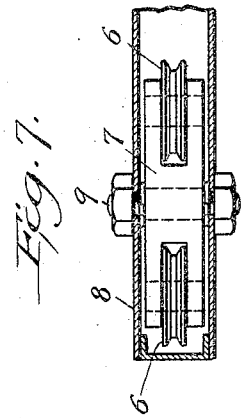
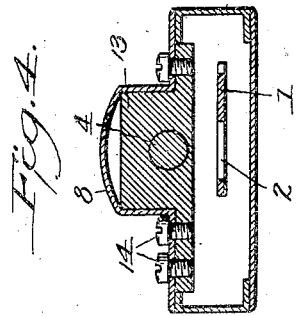
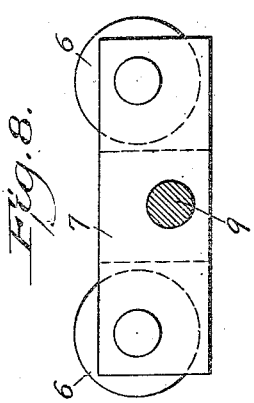
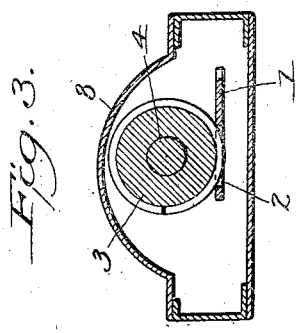
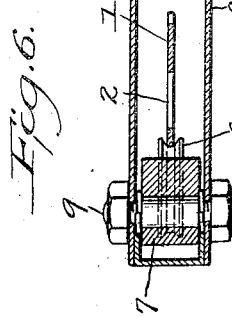
WITNESSES Patented Sept. 2, 1924.

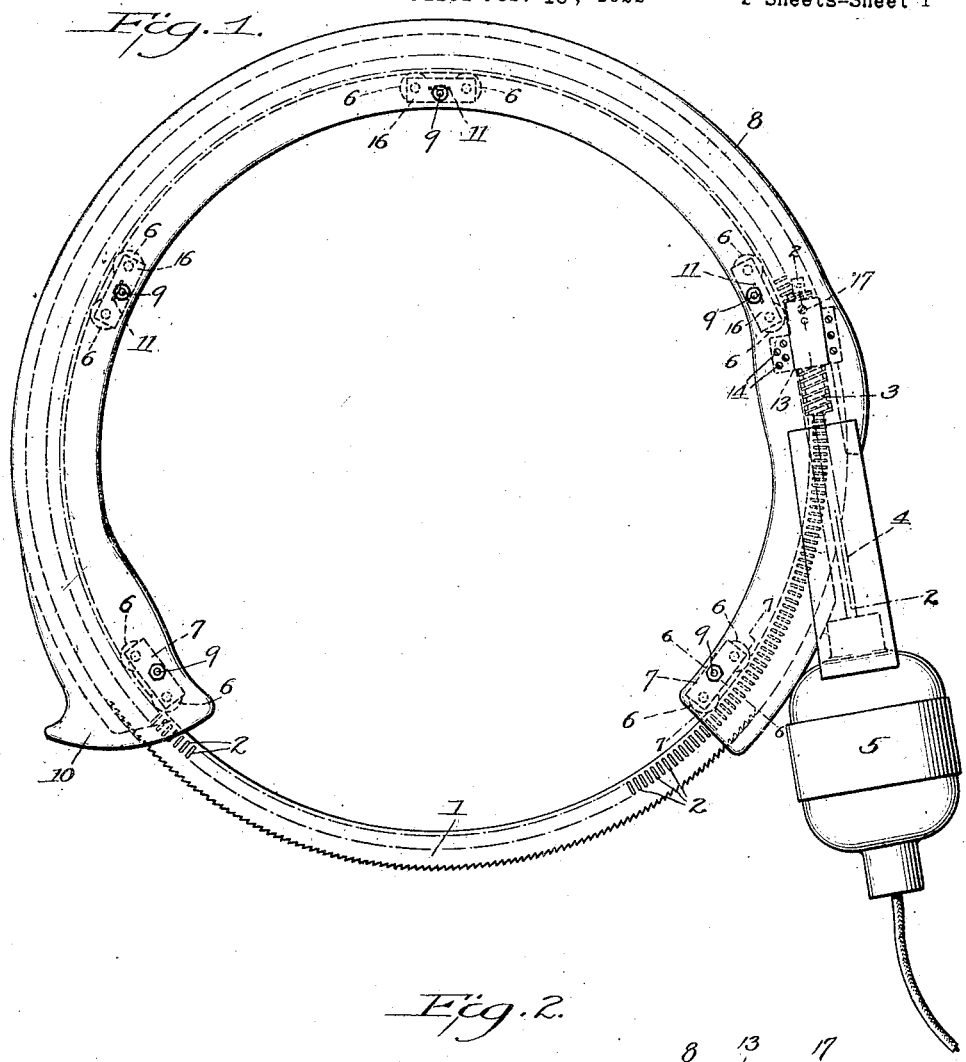

1,507,245

UNITED STATES PATENT OFFICE.

FRANK J. NANKIVELL, OF NEW YORK, N. Y.

PORTABLE POWER SAW.

Application filed February 16, 1922. Serial No. 537,071.

*To all whom it may concern:*

Be it known that I, FRANK J. NANKIVELL, a citizen of Australia, and a resident of the city, county, and State of New York, have invented certain new and useful Improvements in Portable Power Saws, of which the following is a specification.

My invention relates to improvements in the construction of portable motor-driven rim saws. Such saws are used by butchers in sawing the bones in carcasses and for other work of a similar nature.

One object of my invention is to produce a portable saw in which the guard forms the supporting member for the saw blade and driving motor and also acts as a grip. A further object is to provide a saw that will run at a low speed so as to be safe when used in the hands. Another object is to so mount the saw in its supporting frame that slight differences of size or irregularities in the shape of the saw will be taken care of.

To attain these objects, I make the guard so that it may be gripped at any point and drive the saw by a worm gear working directly in radial slots in the saw. Further, I mount the saw on its inner edge on grooved rollers, of which those on at least 180° of its circumference are yieldingly mounted.

In order that my invention may be fully understood, it is described in connection with the accompanying drawings, in which—

Figure 1 is a side view of the complete saw.

Figure 2 is a partial cross section on the line 2—2 of Figure 1.

Figure 3 is a sectional view on the line 3—3 of Figure 5.

Figure 4 is a sectional view on the line 4—4 of Figure 5.

Figure 5 is an enlarged view of the driving mechanism with the upper half of the guard or casing cut away.

Figure 6 is a section on the line 6—6 of Figure 1.

Figure 7 is a section taken on the line 7—7 of Figure 1.

Figure 8 is a side view of the rollers and rocker arm shown in Figure 6.

Figure 9 is a section on the line 9—9 of Figure 5.

Like numerals refer to like parts throughout the several views.

Referring more particularly to the drawings, the annular saw blade 1, Figure 1, is provided with radial slots 2 extending around its circumference and spaced equally according to the pitch of the worm 3 by means of which it is driven through the shaft 4 and the motor 5. The saw 1 is held in place at its inner edge and rotates on the rollers 6 which are grooved, as shown in Figure 7, and the sides of the grooves act to prevent side motion of the saw blade. The frame 8, which also serves as a guard and a grip is of arcuate form, covering approximately three-quarters of the circumference of the saw and when the saw is assembled, the casing forms a sheath completely enclosing the saw blade through this part of its circumference. The gap between the two ends of the guard 8 is provided for the introduction of the material which it is desired to saw. The motor 5 is located on and fastened to the guard 8 near one side of the gap. At the other side of the gap, the end of the guard 8 is provided with an enlargement 10 to prevent the operator's hand from slipping off and becoming engaged in the saw teeth. This affords a construction permitting the saw to be handled by gripping the guard at any point.

Two pairs of rollers 6, one pair on each side of the gap, are rotatably mounted on equalizing levers 7 which are pivoted as shown in Figure 8 on pivot 9, so that the equalizing levers rock about the pivot. The pivots 9 are secured in the sheath or casing 8. The other three pairs of rollers, mounted in spaced relation around the casing, are pivoted as shown in Figures 5 and 9 wherein 11 is a flat spring mounted in the rocker arm 16 in such a way that the rocker arm 16 can pivot about the pivot 9 and can also have a certain amount of radial movement toward the centre of the saw. The flat spring 11 is set in a slot and is tangential to the pin 9. A recess 15 is provided in the lever 16 on the opposite side of the pin 9 to give room for the spring to act.

Referring to Figures 2 and 3, it is seen that the worm 3 engages in several slots 2 of the saw 1 at the same time. This is useful in minimizing the wear and therefore extends the life of the saw. Worm 3 is mounted rigidly on shaft 4 and the thrust of the worm is taken on adjustable screw 12, Figure 2, which has a taper point acting in conjunction with a socket in the end of shaft 4. A set screw 17 serves to hold screw 12 in place.

The metal block 13, Figure 5, serves as a bearing for the shaft 4 and screw 12 is threaded in it. Block 13 is secured to the casing 8 by the screws 14.

I have found that a portable saw, which is not rigidly held to a stationary frame, must run at a low speed to be successfully operated and to protect the operator. Furthermore, in order that the complete outfit be light, it is necessary that the motor be of the high speed type. It is, therefore, necessary to have a very large reduction in speed from that of the motor to that of the saw. This I achieve by the use of the worm drive in which the ratio of reduction may be as high as 300 to 1.

I have also found that it is important to have a comparatively large number of points of support for the saw and that these supports must not be complicated. The use of the equalizing levers 7 and 16 provide a simple and effective arrangement that takes care of inequalities or deformations, due either to wear or temperature changes, in the saw blade;— the two sets of rollers on each side of the point of application of the work moving only about their pivots, while the other sets of rollers can yield radially as well as rock about their pivots.

I am aware that rim saws have been constructed with single rollers yieldingly mounted and also that such saws have been driven by means of gears acting on the periphery; but such prior constructions have not proved to be of long life and economical.

It is to be noted that my portable saw can be operated in any position, but, as a large proportion of the work is done with the article to be sawed below the operator, I have found my construction, wherein the centre of gravity of the saw is below the operator's grip on the frame, of great advantage.

I claim:—

1. A portable saw comprising in combination, an annular saw blade formed with spaced radial slots, and a motor driven worm directly meshing with said radial slots.

2. A portable saw comprising in combination, an annular saw blade formed with spaced radial slots, and a motor driven worm arranged tangential to said blade and directly meshing with said radial slots.

3. A portable saw comprising in combination an annular saw blade having its outer edge provided with teeth, spaced radial slots in said saw blade, a worm gear having a pitch equal to the spacing of and engaging in the said radial slots, a shaft in said worm gear and a high speed motor direct connected to said shaft.

4. A portable saw comprising in combination an annular saw blade formed with radial slots, a casing surrounding said blade for the major part of its circumference, guides carried by said casing for said blade, a motor mounted upon said casing with its shaft in tangential relation to said blade, and a worm upon said motor shaft directly meshing with said radial slots.

5. A portable saw comprising in combination an annular saw blade having its outer edge provided with teeth, a casing surrounding said blade for the major part of its circumference, pins mounted in said casing at a plurality of points, equalizing levers pivoting upon said pins, and grooved rollers rotatably mounted on said equalizing levers, one at each end thereof, and contacting with the inner edge of the annular saw.

6. A portable saw comprising in combination an annular saw blade, a sheath surrounding said saw blade throughout the major portion of its periphery, pivots mounted in said sheath, equalizing levers mounted on said pivots, grooved rollers rotatably mounted on said equalizing levers and contacting with the inner edge of the annular saw blade, some of said equalizing levers being arranged to yield radially upon their pivots, and means for driving said blade.

7. A portable saw comprising in combination an annular saw blade, a sheath surrounding said saw blade throughout the major portion of its periphery and having a gap for the reception of the material to be sawed, pivots mounted in said sheath, equalizing levers mounted on said pivots, grooved rollers rotatably mounted on said equalizing levers and contacting with the inner edge of the annular saw blade, two of said equalizing levers being mounted upon said sheath adjacent to said gap for pivotal movement only, and a plurality of said equalizing levers being mounted in spaced relation upon said sheath for both pivotal and radial movement, and means for driving said blade.

FRANK J. NANKIVELL.